(12) United States Patent
Sujan et al.

(10) Patent No.: US 12,441,319 B2
(45) Date of Patent: Oct. 14, 2025

(54) SYSTEMS AND METHODS FOR CONTROLLING OVERTAKE MANEUVER IN VEHICLES

(71) Applicant: Cummins Inc., Columbus, IN (US)

(72) Inventors: Vivek Anand Sujan, Columbus, IN (US); Thomas M. Yonushonis, Columbus, IN (US)

(73) Assignee: Cummins Inc., Columbus, IN (US)

( * ) Notice: Subject to any disclaimer, the term of this patent is extended or adjusted under 35 U.S.C. 154(b) by 104 days.

(21) Appl. No.: 18/228,890

(22) Filed: Aug. 1, 2023

(65) Prior Publication Data
US 2025/0042405 A1 Feb. 6, 2025

Related U.S. Application Data

(63) Continuation of application No. 17/323,552, filed on May 18, 2021, now Pat. No. 11,753,015, which is a (Continued)

(51) Int. Cl.
*B60K 6/42* (2007.10)
*B60W 30/18* (2012.01)
(Continued)

(52) U.S. Cl.
CPC ...... *B60W 30/18163* (2013.01); *B60W 40/12* (2013.01); *B60K 6/42* (2013.01);
(Continued)

(58) Field of Classification Search
CPC ......... B60W 30/18163; B60W 60/001; B60W 2554/4041; B60W 2554/801;
(Continued)

(56) References Cited

U.S. PATENT DOCUMENTS 7,146,272 B2 12/2006 Yanagidaira et al.
9,157,761 B2 10/2015 Levin
(Continued)

FOREIGN PATENT DOCUMENTS

CN 105984342 A 10/2016
CN 106564498 A 4/2017
(Continued)

OTHER PUBLICATIONS

Exam Report on EP Application. No. 19902385.4 dated May 23, 2024.
(Continued)

*Primary Examiner* — Rachid Bendidi
*Assistant Examiner* — Hossam M Abd El Latif
(74) *Attorney, Agent, or Firm* — Foley & Lardner LLP

(57) ABSTRACT

A system for controlling an overtake maneuver of a control vehicle includes a controller. The controller is structured to: receive at least one overtake parameter associated with a control vehicle for overtaking a front vehicle in a vehicle lane; receive an indication of a direction of traffic in an overtake lane that is adjacent to the vehicle lane; receive an indication that the at least one overtake parameter satisfies at least one condition according to the direction of the traffic in the overtake lane; and in response to the at least one overtake parameter satisfying the at least one condition according to the direction of traffic in the overtake lane, execute an overtake maneuver by adjusting at least one parameter of the control vehicle or providing a command to an operator of the control vehicle to execute the overtake maneuver.

20 Claims, 11 Drawing Sheets

Related U.S. Application Data continuation of application No. PCT/US2019/068281, filed on Dec. 23, 2019.

(60) Provisional application No. 62/785,881, filed on Dec. 28, 2018.

(51) Int. Cl.
| | |
|---|---|
| *B60W 40/12* | (2012.01) |
| *B60W 50/14* | (2020.01) |
| *B62D 37/02* | (2006.01) |
| *G05D 1/00* | (2024.01) |
| *G08G 1/16* | (2006.01) |

(52) U.S. Cl.
CPC .. *B60W 2520/10* (2013.01); *B60W 2554/4041* (2020.02); *B60W 2554/4042* (2020.02); *B60W 2554/4044* (2020.02); *B60W 2554/80* (2020.02); *B60W 2554/801* (2020.02); *B60W 2555/20* (2020.02); *B60W 2555/60* (2020.02); *B60W 2710/06* (2013.01); *B60W 2710/10* (2013.01); *B60W 2720/00* (2013.01); *B60W 2754/30* (2020.02); *B60Y 2200/91* (2013.01); *B60Y 2200/92* (2013.01); *B60Y 2300/18166* (2013.01); *B62D 37/02* (2013.01)

(58) Field of Classification Search
CPC ......... B60W 2554/802; B60W 10/04; B60W 10/18; B60W 10/20; B60W 40/04; B60W 40/105; B60W 2520/10; B60W 2554/4042; B60W 2554/4044; B60W 2554/4045
USPC .......................................................... 701/41
See application file for complete search history.

(56) References Cited

U.S. PATENT DOCUMENTS

| | | | |
|---|---|---|---|
| 9,533,685 B2 | 1/2017 | Ask | |
| 9,550,496 B2 | 1/2017 | Suzuki et al. | |
| 9,682,712 B2 | 6/2017 | Kubo | |
| 9,688,278 B2 | 6/2017 | Harda et al. | |
| 9,783,201 B2 | 10/2017 | Heinrich et al. | |
| 2011/0313665 A1 | 12/2011 | Lueke et al. | |
| 2013/0271295 A1 | 10/2013 | Huelbusch | |
| 2015/0353094 A1* | 12/2015 | Harda | B60W 30/18163 |
| | | | 701/23 |
| 2015/0360684 A1 | 12/2015 | Matsuno et al. | |
| 2015/0375748 A1* | 12/2015 | Nagase | B60W 50/0097 |
| | | | 701/41 |
| 2016/0214613 A1 | 7/2016 | Herzhauser et al. | |
| 2017/0101102 A1* | 4/2017 | Matei | G05D 1/0259 |
| 2017/0103657 A1 | 4/2017 | Hu | |
| 2017/0334446 A1 | 11/2017 | Bosch et al. | |
| 2018/0081371 A1 | 3/2018 | Bar-Tal et al. | |
| 2018/0154894 A1* | 6/2018 | Norwood | B60W 30/09 |
| 2019/0232960 A1* | 8/2019 | Yokota | B60W 30/16 |
| 2020/0039363 A1* | 2/2020 | Degand | B60L 58/12 |
| 2021/0009115 A1 | 1/2021 | Ohmura et al. | |
| 2021/0039640 A1 | 2/2021 | Jakobsson et al. | |

FOREIGN PATENT DOCUMENTS

| | | |
|---|---|---|
| DE | 10 2011 118 336 | 6/2012 |
| DE | 10 2011 076 085 | 11/2012 |
| DE | 10 2011 086 299 | 5/2013 |
| EP | 2 423 902 | 2/2012 |
| EP | 2 837 538 A1 | 2/2015 |
| FR | 3062833 A1 | 8/2018 |
| WO | WO-2006/037360 | 4/2006 |
| WO | WO-2013/187835 | 12/2013 |

OTHER PUBLICATIONS

Chinese Office Action on CN application No. 2019800755144 dated Apr. 12, 2023.
Foreign Search Report on EP 19902385.4 dtd Aug. 1, 2022.
International Search Report and Written Opinion on International Application No. PCT/US2019/068281, mail date Feb. 25, 2020, 11 pages.
Notice of Allowance on U.S. Appl. No. 17/323,552 dtd May 1, 2023.
EPO Examination Report for Application No. 19902385.4 mailing date Feb. 27, 2025, 5 pages.

* cited by examiner

SYSTEMS AND METHODS FOR CONTROLLING OVERTAKE MANEUVER IN VEHICLES

CROSS-REFERENCE TO RELATED APPLICATIONS

This application is a Continuation of U.S. application Ser. No. 17/323,552, filed May 18, 2021, which is a Continuation of PCT Application No. PCT/US2019/068281, filed Dec. 23, 2019, which claims the benefit of and priority to U.S. Provisional Application No. 62/785,881, filed Dec. 28, 2018, all of which are incorporated herein by reference in their entireties and for all purposes.

TECHNICAL FIELD

The present disclosure relates generally to systems and methods for controlling overtake maneuver in autonomous and semi-autonomous vehicles.

BACKGROUND

Autonomous or semi-autonomous vehicles (e.g., trucks, long haulers, cars, buses, minivans, etc.) may encounter a front vehicle traveling ahead of the vehicle. In certain situations, it may be desirable for the vehicle to overtake the front vehicle. For example, the front vehicle may be traveling at a slower velocity than a specified speed limit on the vehicle route, which may be delaying the travel time of the vehicle to its destination. Autonomous and semi-autonomous vehicles are generally not configured to autonomously perform overtake maneuvers. Thus, overtake maneuvers in such vehicles are performed by an operator of the vehicle and is therefore based entirely on the judgement of the operator. This may create safety issues, for example, causing the vehicle to exceed a predefined speed limit, misjudging the distance to encounter an oncoming vehicle in the overtake lane, and/or causing traffic backup due to a large number of rear vehicles present in the overtake lane behind the vehicle.

SUMMARY

Embodiments described herein relate generally to systems and methods for controlling overtake maneuver of a control vehicle, and in particular, to controllers structured to control overtake maneuvers based on various parameters including an operating parameter of the vehicle and the front vehicle that the control vehicle is overtaking, a direction of traffic in an overtake lane, a number of vehicles traveling in the overtake lane behind the control vehicle, and/or operating parameter of an oncoming vehicle in the overtake lane.

In some embodiments, a system for controlling an overtake maneuver of a control vehicle comprises a controller structured to determine an overtake velocity for a control vehicle traveling in a vehicle lane to overtake a front vehicle traveling ahead of the control vehicle in the vehicle lane; determine an overtake time for the control vehicle to overtake the front vehicle based on the overtake velocity; determine a direction of traffic in an overtake lane that is adjacent to the vehicle lane; in response to the direction of traffic in the overtake lane being the same as a direction of traffic in the vehicle lane, determine whether the overtake velocity is less than or equal to an allowed velocity; in response to the overtake velocity being less than or equal to the allowed velocity, execute the overtake maneuver by one of adjusting a parameter of at least one of an engine or a transmission of the control vehicle or providing a command to an operator of the control vehicle to execute the overtake maneuver.

In some embodiments, a method comprises: determining, by a controller, an overtake velocity for a control vehicle traveling in a vehicle lane to overtake a front vehicle traveling ahead of the control vehicle in the vehicle lane; determining, by the controller, an overtake time for the control vehicle to overtake the front vehicle based on the overtake velocity; determining, by the controller, a direction of traffic in an overtake lane that is adjacent to the vehicle lane; in response to the direction of traffic in the overtake lane being the same as a direction of traffic in the vehicle lane, determining, by the controller, whether the overtake velocity is less than or equal to an allowed velocity; and in response to the overtake velocity being less than or equal to the allowed velocity, executing, by the controller, the overtake maneuver by one of adjusting a parameter of at least one of an engine or a transmission of the control vehicle or providing a command to an operator of the control vehicle to execute the overtake maneuver.

It should be appreciated that all combinations of the foregoing concepts and additional concepts discussed in greater detail below are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
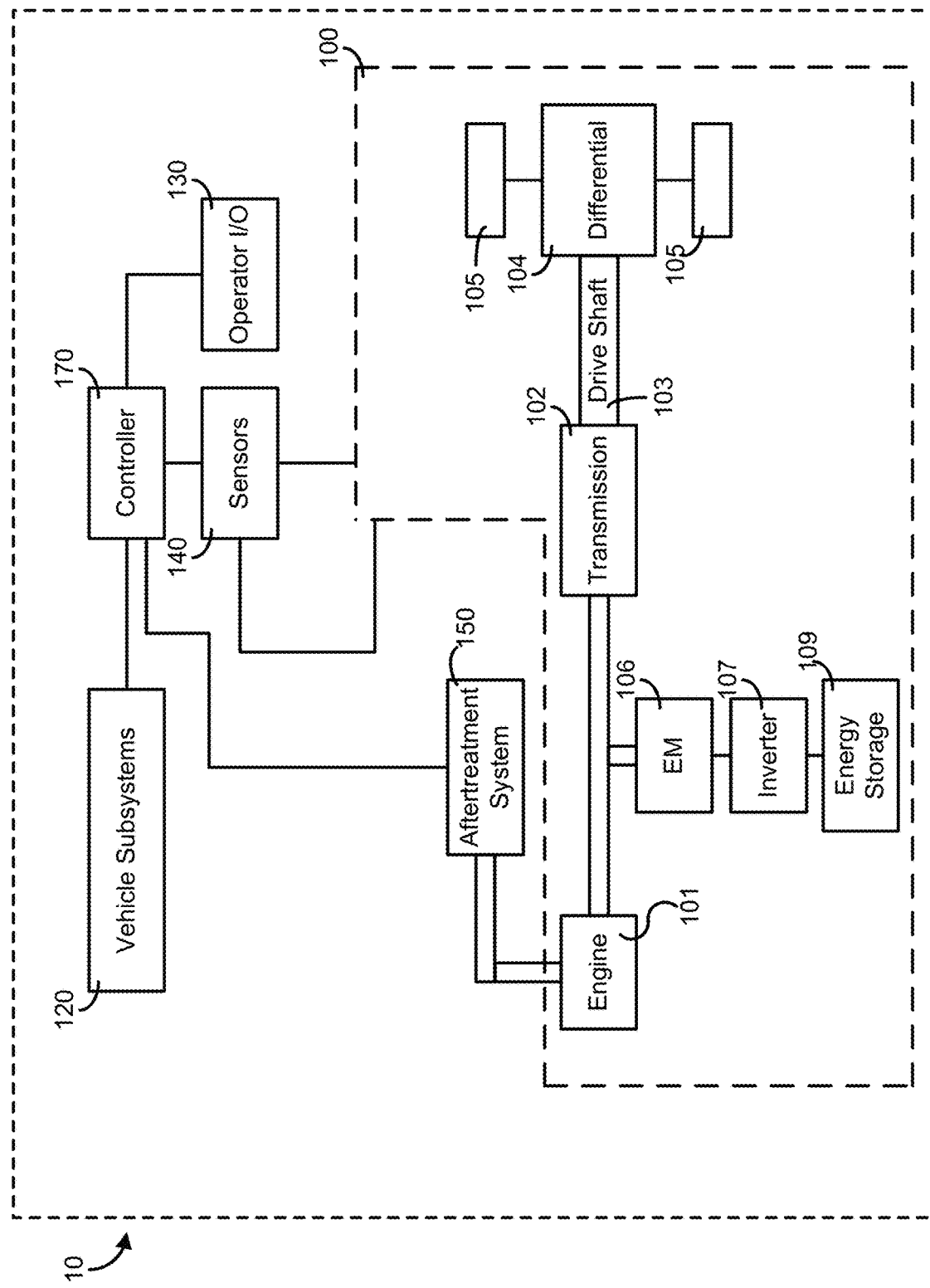
FIG. 1 is a schematic illustration of a control vehicle including a controller, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling a vehicle to implement an overtake maneuver of a control vehicle, and in particular, to controllers structured to control a vehicle to implement an overtake maneuver based on various parameters including operating parameters of the vehicle and the front vehicle that the control vehicle is overtaking, a direction of traffic in an overtake lane, a number of vehicles traveling in the overtake lane behind the control vehicle, and/or operating parameter of an oncoming vehicle in the overtake lane.

Autonomous and semi-autonomous vehicles may have to perform several maneuvers while traveling on a route. One of these is to determine if an overtake maneuver is feasible and reasonable during the course of normal driving of the vehicle. In such a situation, it may be desirable to assess ability of the control vehicle to pass a front vehicle traveling in front of the control vehicle as well as determine if the constraints during overtaking are acceptable in the presence of oncoming traffic so as to perform the overtake maneuver. In addition, it is also desirable to determine if an overtake maneuver (e.g., performed in a multi-lane highway) will result in the slowing down of a number of other faster rear vehicles traveling behind the control vehicle in the overtake lane. This is typically seen in heavy duty commercial vehicle operating on the highway, where a tractor-trailer will move over to the left lane to overtake a slower vehicle in the right lane. However, its relative velocity (especially due to the upcoming terrain) can make this a very slow maneuver, sometimes taking several minutes to complete. This results in traffic backup, loss of overall "system" fuel economy (e.g., of all vehicles traveling in the same vicinity), and reduced safety.

To efficiently perform an overtake maneuver, systems and methods described herein use various static and dynamic parameters of a control vehicle, a front vehicle that is being overtaken by the control vehicle, rear vehicles behind the control vehicle, and oncoming vehicles to determine if an overtake maneuver can be executed by the control vehicle in the presence of traffic. Systems and methods described herein make use of powertrain capabilities, knowledge of the upcoming terrain, and traffic kinematics to create an assessment of time and distance needed to overtake the front vehicle over a number of different control vehicle velocities. Systems and methods described herein also use traffic kinematics to determine if the process of overtaking the front vehicle can be done with time margin to spare, while preventing traffic backup. While embodiments described herein are generally described with respect to single control vehicle, the concepts described herein can be equally applied to a platoon of control vehicles.

Various embodiments of the systems and methods described herein may provide one or more benefits including, for example: (1) increasing safety by predicting various parameters for performing an overtake maneuver and only allowing overtaking if the overtake maneuver can be performed within a predetermined time; (2) preventing traffic backups by predicting a behavior of rear vehicles following the control vehicle in response to the overtake maneuver; and (3) having minimal impact on efficiency and fuel economy of the control vehicle and rear vehicles that may be impacted by the overtake maneuver.

FIG. 1 is schematic block illustration of a control vehicle 10 including a controller 170, according to an embodiment. As shown in FIG. 1, the vehicle 10 generally includes a powertrain 100, vehicle subsystems 120, an operator input/output (I/O) device 130, sensors 140 communicably coupled to one or more components of the control vehicle 10, and a controller 170. It is to be understood that while FIG. 1 shows the control vehicle 10 as including a particular powertrain 100, the control vehicle 10 may include any other powertrain (e.g., an automatic, a purely electric power driven powertrain or any other suitable powertrain). The control vehicle 10 may include an autonomous or semi-autonomous vehicle, for example, a truck, a bus, a tractor trailer, etc. In various embodiments, the control vehicle 10 may be part of a vehicle platoon including a plurality of vehicles travelling on a route. Each of the vehicles included in the platoon may be substantially similar to the control vehicle 10.

According to an example embodiment, the powertrain 100 of the control vehicle 10 is structured as a series hybrid powertrain. In other embodiments, the powertrain 100 may be structured as a parallel hybrid powertrain, or a full electric powertrain. In some embodiments, the powertrain 100 of the control vehicle 10 is structured as another type of hybrid powertrain. In some embodiments, the powertrain 100 is structured as a conventional, non-hybrid, non-electric powertrain. In such embodiments, an energy storage device 109, an inverter 107, and the EM device 106 associated with the hybrid portion of the powertrain 100 are excluded. The control vehicle 10 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. Thus, the present disclosure is applicable with a wide variety of implementations. The control vehicle 10 may include an autonomous or semi-autonomous vehicle such that at least some of the operations thereof are controlled autonomously by the controller 170. In various embodiments, the control vehicle 10 may be part of a vehicle platoon including a plurality of vehicles travelling on a route. Each of the vehicles included in the platoon may be substantially similar to the control vehicle 10.

Components of the control vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the systems and components in the control vehicle 10 of FIG. 1, the controller 170 is structured to receive data regarding one or more of the components shown in FIG. 1. For example, the data may include operation data regarding control parameters of the control vehicle 10, e.g., operating conditions of the powertrain 100, and/or other components (e.g., the energy storage device 109, the EM device 106, a regenerative braking system, an engine 101, a transmission 102, etc.) acquired by one or more sensors, such as sensors 140. As another example, the data may include an input from operator I/O device 130. The controller 170 may determine how to control the powertrain 100, for example, the engine 101 and the transmission 102 based on the various control parameters. In some embodiments in which the control vehicle 10 includes a hybrid vehicle, the controller 170 may also be structured to control a power split between the engine 101 and the energy storage device 109 based on the control parameter.

As shown in FIG. 1, the powertrain 100 (e.g., a series hybrid powertrain, etc.) includes the engine 101, the transmission 102, a driveshaft 103, a differential 104, a final drive 105 (e.g., wheels of the control vehicle 10), the electromagnetic (EM) device 106 (e.g., a generator, a motor-generator, etc.), an inverter 107, and an energy storage device 109. In some embodiments, the powertrain 100 may also include a second electromagnetic device in series with the EM device 106. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). Similarly, the transmission 102 may be structured as any type of transmission, such as a continuous variable transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby. Further, the driveshaft 103 may be structured as any type of driveshaft including, but not limited to, a one-piece, two-piece, and a slip-in-tube driveshaft based on the application.

As shown in FIG. 1, the engine 101 and the EM device 106 are mechanically coupled together (e.g., via a shaft, a gear box, etc.). In some embodiments, the EM device 106 is a single device having both generating and motoring capabilities. In some embodiments, the EM device 106 has only generating capabilities. In other embodiments, the EM device 106 has only motoring capabilities. According to an example embodiment, the engine 101 is structured to drive the EM device 106 to generate electrical energy. As shown in FIG. 1, the EM device 106 is electrically coupled to the energy storage device 109 via an inverter 107 such that the EM device 106 may provide energy generated thereby to the energy storage device 109 for storage. In some embodiments, the EM device 106 is structured to receive stored electrical energy from the energy storage device 109 to facilitate operation thereof. By way of example, the EM device 106 may receive stored electrical energy from the energy storage device 109 to facilitate starting the engine 101. As shown in FIG. 1, the electromagnetic device 106 is also mechanically coupled to the transmission 102 (e.g., via a shaft, a gear box, etc.). For example, the control vehicle 10 may include a hybrid vehicle drivable using power from the engine 101, the energy storage device 109 via the EM device 106, or a combination thereof.

As shown in FIG. 1, the EM device 106 is electrically coupled to the energy storage device 109 such that the EM device 106 may receive energy stored by the energy storage device 109 and/or generated by the EM device 106 to facilitate operation thereof. By way of example, the EM device 106 may receive stored electrical energy from the energy storage device 109 to facilitate providing a mechanical output to the transmission 102. In some embodiments, the EM device 106 is structured to generate electrical energy for storage in the energy storage device 109. By way of example, the EM device 106 may be structured to utilize a negative torque supply to perform energy regeneration (e.g., when the torque demand therefrom is zero, during engine braking, while the control vehicle 10 is coasting down a hill, etc.).

According to an example embodiment, the energy storage device 109 includes one or more batteries (e.g., high voltage batteries, a lead-acid battery, a lithium-ion battery, etc.), one or more capacitors (e.g., super capacitors, etc.), and/or any other energy storage devices, or combination thereof. As shown in FIG. 1, the energy storage device 109 is electrically coupled to the EM device 106. In some embodiments, the energy storage device 109 and the EM device 106 are electrically coupled to one or more of the vehicle subsystems 120 (e.g., a regenerative braking system, electrically-powered vehicle accessories, etc.).

According to the example embodiment shown in FIG. 1, the energy storage device 109 is structured to store electrical energy (i) received from a charging station (e.g., a vehicle charging station, etc.), (ii) generated by the EM device 106, and/or (iii) generated by a regenerative braking system. The energy storage device 109 may be structured to provide the stored electrical energy to (i) the vehicle subsystems 120 to operate various electrical based components of the vehicle 10 (e.g., while the engine 101 is running, while the engine 101 is off, etc.), (ii) the EM device 106 to start the engine 101 (e.g., in response to a restart command after a stop-start feature turns off the engine 101, when an operator keys on the engine 101, etc.), and/or (iii) the EM device 106 to facilitate providing a mechanical output to the transmission 102 (e.g., to drive the control vehicle 10, etc.).

The control vehicle 10 includes the vehicle subsystems 120. In some embodiments, the vehicle subsystems 120 may include a regenerative braking system. The regenerative braking system may include various components structured to generate electricity from vehicle braking events to be stored by the energy storage device 109 for future use (e.g., by the EM device 106, by the electrical vehicle components, etc.). The vehicle subsystems 120 may include other components including mechanically driven or electrically driven vehicle components (e.g., HVAC system, lights, pumps, fans, etc.).

The vehicle subsystems 120 may include one or more electrically-powered accessories and/or engine-drive accessories. Electrically-powered accessories may receive power from the energy storage device 109 and/or the EM device 106 to facilitate operation thereof. Being electrically-powered, the accessories may be able to be driven largely independent of the engine 101 of the vehicle 10 (e.g., not driven off a belt coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered vehicle accessories.

In a traditional, non-hybrid or non-electric powertrain, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft speed. The rotating driveshaft 103 is received by the differential 104, which provides the rotation energy of the driveshaft 103 to the final drive 105 (e.g., wheels of the vehicle 10). The final drive 105 then propels or moves the control vehicle 10.

In the powertrain 100 of the present disclosure, the engine 101 provides mechanical energy to the EM device 106 such that the EM device 106 generates electrical power. The EM device 106 may provide the generated electrical power to the energy storage device 109 and/or a second electromagnetic device.

The operator I/O device 130 may enable an operator of the control vehicle 10 (or passenger or manufacturing, service, or maintenance personnel) to communicate with the control vehicle 10 and the controller 170. By way of example, the operator I/O device 130 may include, but is not limited to, an interactive display, a touchscreen device, one or more buttons and switches, voice command receivers, and the like. In one embodiment, the operator I/O device 130 includes a brake pedal or a brake lever, an accelerator pedal, and/or an accelerator throttle.

The sensors 140 may include sensors positioned and/or structured to monitor operating characteristics of various components of the control vehicle 10. By way of example, the sensors 140 may include a sensor structured to facilitate monitoring the state of charge ("SOC"), the state of health ("SOH"), and/or the power capacity of the energy storage device 109, and/or the flow of electricity into and/or out of the energy storage device 109 (e.g., current, voltage, power, etc.). The sensors 140 may additionally or alternatively include a position sensor structured to facilitate monitoring the position of the accelerator (e.g., accelerator pedal, accelerator throttle, etc.) and/or the brake (e.g., brake pedal, brake lever, etc.) of the control vehicle 10. The sensors 140 may additionally or alternatively include a speed sensor structured to facilitate monitoring the speed of the vehicle 10. The sensors 140 may additionally or alternatively include an obstacle sensor structured to facilitate detecting whether the vehicle 10 (e.g., a wheel thereof, etc.) encounters an obstacle (e.g., a curb, a rock, a boulder, a speed bump, a pothole, etc.).

In some embodiments, the sensors 140 may include a GPS sensor structured to sense a position of the vehicle. The GPS sensor or any other route information sensor included in the sensors 140 may be structured to provide look ahead information to the controller 170, for example, traffic ahead and behind of the control vehicle 10 on the route, traffic velocity, speed limit, road grade, road construction, time of day information, weather information (e.g., rain, snow, clear, etc.), which may be telematically received from a GPS service provide, a central server, a weather service, a news network, etc.

In some embodiments, the sensors 140 may also include a radar (e.g., a laser Doppler radar) structured to provide information on overtake parameters which may include information on a front vehicle traveling ahead of the control vehicle 10 on a vehicle lane, rear vehicles traveling behind the control vehicle 10 in the vehicle lane in which the control vehicle 10 is traveling, and/or an overtake lane adjacent to the vehicle lane, and any oncoming vehicle approaching the control vehicle 10 in the overtake lane. In various embodiments, the overtake parameter may include a control vehicle length of the control vehicle 10 which may be predetermined and stored in a memory of the controller 170, a front vehicle length of the front vehicle, an initial distance between the control vehicle 10 and the front vehicle before overtaking, a final distance between the control vehicle 10 and front vehicle after overtaking which may be predefined or determined based on a velocity of the front vehicle, an initial velocity of the control vehicle 10 before overtaking, and the front vehicle velocity. In some embodiments, the overtake parameter may also include, a number of rear vehicles in a rear horizon trailing the control vehicle 10, and a position and velocity of the rear vehicles. In some embodiments, the overtake parameter may also include a speed and location of an oncoming vehicle in the overtake lane, for example in situations in which the overtake lane has opposite traffic direction relative to a direction of travel of the control vehicle 10.

As previously described herein, in embodiments in which the control vehicle 10 includes the engine 101, the engine 101 combusts fuel to produce an exhaust gas including NOx gases, particulate matter (e.g., ash or soot), carbon monoxide and other constituents which need to be removed from the exhaust gas before the exhaust gas is expelled into the environment. In such embodiments, the control vehicle 10 includes an aftertreatment system 150 structured to reduce constituents of the exhaust gas. In particular embodiments, in which the engine 101 is a diesel powered engine, the aftertreatment system 150 may include a reductant insertion assembly for inserting a reductant into the exhaust gas to facilitate decomposition of the NOx gases. The aftertreatment system 150 may also include any other suitable components, for example, oxidation catalysts (e.g., diesel oxidation catalyst, ammonia oxidation catalyst, mixers, filters, NOx sensors, temperature sensors, pressure sensors, particulate matter sensors, etc.).

As the components of FIG. 1 are shown to be embodied in the control vehicle 10, the controller 170 may be structured as one or more electronic control units (ECU). As such, the controller 170 may be separate from or included with at least one of a transmission control unit, a powertrain control module, an engine control module, etc. In some embodiments, the controller 170 may include a central controller of the control vehicle 10.

In some embodiments, the controller 170 is structured to control an overtake maneuver of the control vehicle 10 autonomously or semi-autonomously so as to allow the control vehicle 10 to overtake a front vehicle traveling ahead of the control vehicle 10 in the vehicle lane. For example, the control vehicle 10 may be traveling on a vehicle lane on multilane highway where traffic in the vehicle lane and the overtake lane adjacent to the vehicle lane is traveling in the same direction. In other instances, the control vehicle 10 may be traveling on smaller roads where oncoming traffic may be present in the overtake lane adjacent to the vehicle lane.

Figure 10:
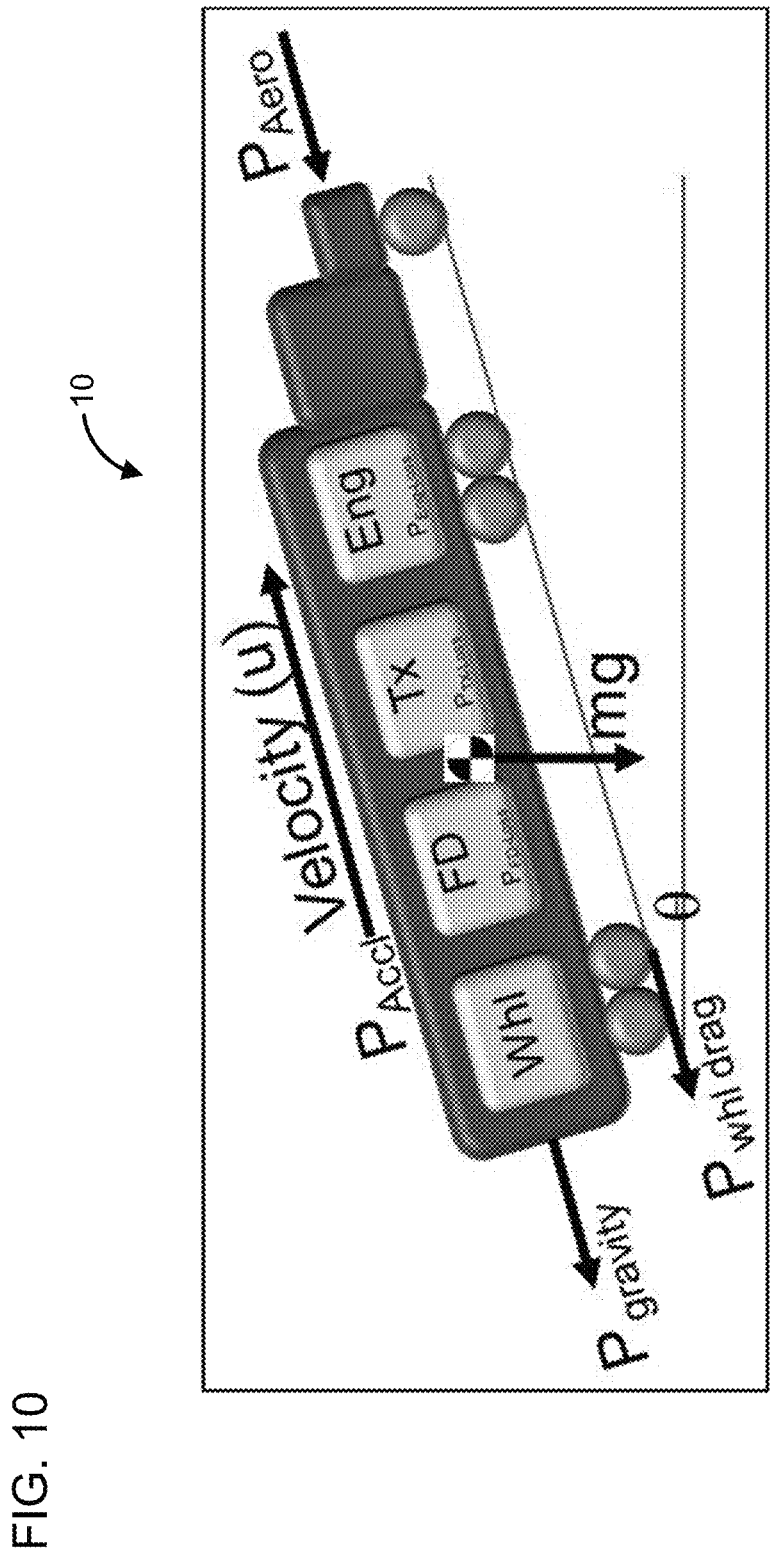
FIG. 10 is a schematic illustration of the control vehicle of FIG. 1 and various control vehicle parameters of the control vehicle.

The controller 170 is structured to determine an overtake velocity for the control 10 vehicle traveling in the vehicle lane to overtake the front vehicle traveling ahead of the control vehicle in the vehicle lane, and determine an overtake time for the control vehicle 10 to overtake the front vehicle based on the overtake velocity, as described in further detail herein. In some embodiments, the controller 170 is structured to determine a control vehicle parameter of the control vehicle 10 traveling on the vehicle lane. In various embodiments, the control vehicle parameter includes a control vehicle weight, a control vehicle aerodynamic resistance, a control vehicle rolling resistance and a control vehicle transmission loss. For example, FIG. 10 is a schematic illustration of the control vehicle 10 showing the various control parameters thereof. The control vehicle weight (mg) may be a predetermined value determined at a weighing station and stored in a memory of the controller 170. Aerodynamic resistance ($P_{aero}$) corresponds to the wind drag acting on the control vehicle 10. The control vehicle rolling resistance may depend on the gravitational force acting on the control vehicle 10 (e.g., due to the control vehicle 10 traveling on an incline). The control vehicle transmission loss may correspond to frictional losses in the transmission 102 and the differential 104. The controller 170 may determine an available peak engine power of the engine 101 corresponding to a desired power from the engine 101 based on the control vehicle parameter, for example, via the following equation:

$$P_{Propulsion} = P_{engout} = P_{Aero} + P_{Whl\,drag} + P_{Gravity} + P_{Accl} + P_{Loss}$$

$$P_{Aero} = \left(\frac{A \cdot C_D \cdot \rho \cdot u^2}{2}\right) u$$

$$P_{Whl\,drag} = (C_{rr-dyn}(m \cdot g \cdot \cos\theta)u + C_{rr-static}(m \cdot g \cdot \cos\theta))u =$$

$$(C_{rr-dyn} \cdot u + C_{rr-static})(m \cdot g \cdot \cos\theta)u$$

$$P_{Gravity} = (m \cdot g \cdot \sin\theta)u$$

$$P_{Accl} = P_{vehicle\atop Accl} + P_{Wheel\atop Accl} + P_{FD\atop Accl} + P_{trans\atop Accl} + P_{eng\atop Accl} = (m \cdot a)u +$$

$$(I_{whl}\dot{\omega}_{whl})\omega_{whl} + (I_{FD}\dot{\omega}_{FD})\omega_{FD} + (I_{trans}\dot{\omega}_{trans})\omega_{trans} + (I_{eng}\dot{\omega}_{eng})\omega_{eng}$$

$$P_{Loss} = P_{FD\atop Loss} + P_{trans\atop Loss} + P_{eng\atop Loss} =$$

$$\mathcal{J}(\omega_{FD\,in}\tau_{FD\,in}) \cdot \omega_{FD\,in} + \mathcal{J}(\omega_{trans\,in}\tau_{trans\,in}) \cdot \omega_{trans\,in} + \mathcal{J}(\omega_{eng\,out}) \cdot \omega_{eng\,out}$$

$$\therefore P_{engout} = P_{Aero} + P_{Whl\,drag} + P_{Gravity} +$$

$$\left(P_{vehicle\atop Accl} + P_{Wheel\atop Accl} + P_{FD\atop Accl} + P_{trans\atop Accl} + P_{eng\atop Accl}\right) + \left(P_{FD\atop Loss} + P_{trans\atop Loss} + P_{eng\atop Loss}\right)$$

While the equation includes $P_{engLoss}$ corresponding to power lost in the engine 101, this is generally accounted for in engine out power $P_{eng\,out}$ and may be excluded from the $P_{eng\,out}$ equation. The controller 170 may use the control vehicle parameter, for example, to determine available peak engine power from the engine 101 or the EM device 106, and execute the overtake maneuver if the overtake velocity is achievable based on the available peak engine power. For example, if the engine 101, the EM device 106 or the combination thereof cannot provide the desired power for performing the overtake maneuver, for example, based on the control vehicle parameter, an upcoming terrain (e.g., an upcoming incline or hill), weather conditions, etc., the controller 170 may abort the overtake maneuver.

Figure 4:
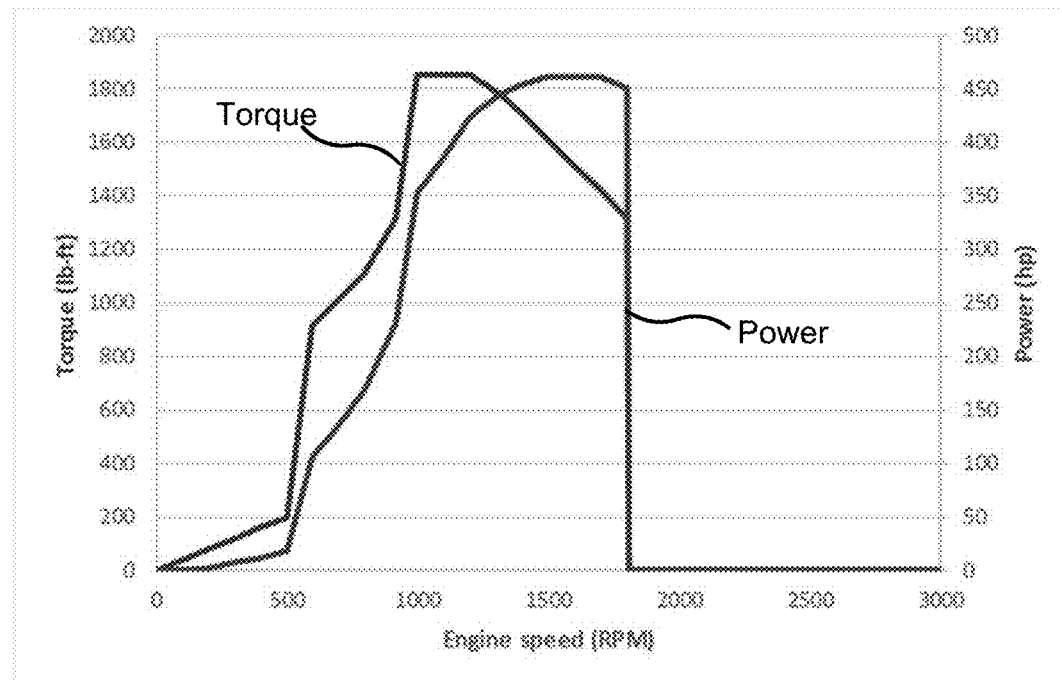
FIG. 4 shows plots of engine power and torque of an engine of the vehicle of FIG. 1 at various engine speeds.
Figure 5:
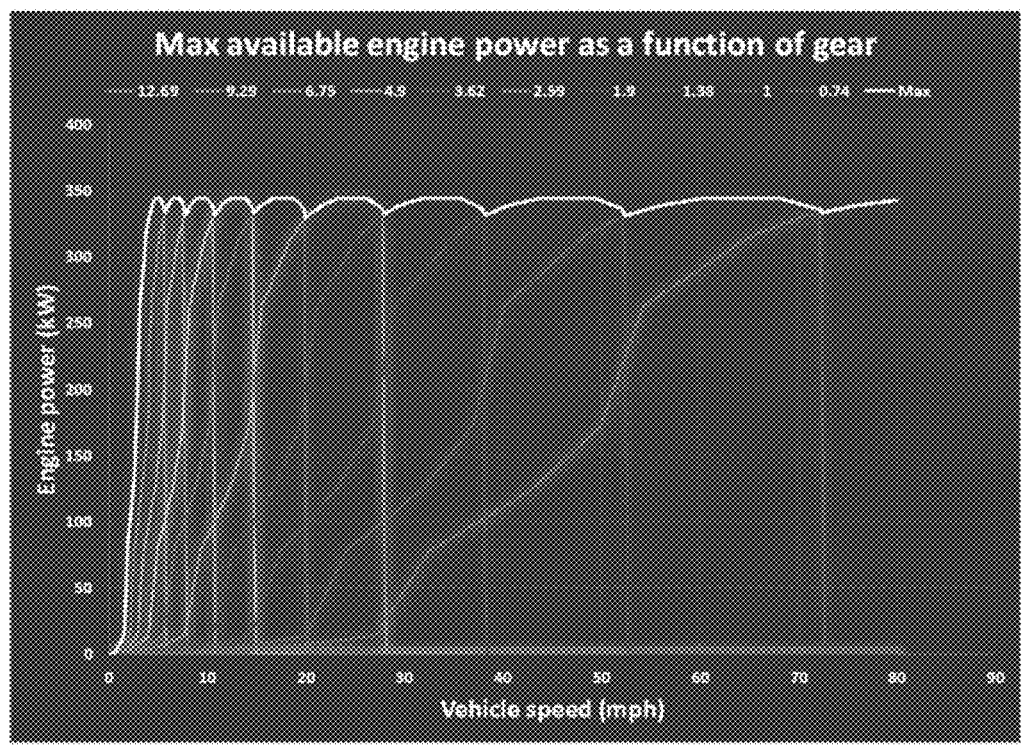
FIG. 5 shows plots of engine power versus vehicle speeds at various gear ratios and maximum available engine power at various gear ratios.

The available peak engine power may also be determined based on engine torque curves of the engine 101 and various transmission gear ratios available in the transmission 102, for example, based on the control vehicle parameter. For example, FIG. 4 shows an example torque and power curve of an engine corresponding to various engine rpms. FIG. 5 shows plots showing vehicle speeds to available peak or maximum engine power based on various gear ratios. In various embodiments, torque, power and speed curves corresponding to the powertrain 100 may be stored in a memory (e.g., the memory 173) of the controller 170, and the controller 170 may be structured to run simulations based on the various parameters described herein to determine the available peak engine power.

In some embodiments, the controller 170 may also be structured to determine an upcoming terrain profile to be encountered by the control vehicle 10 during the overtaking maneuver. For example, the controller 170 may receive information from a GPS sensor, from a central server, a news station, or any other information network regarding the upcoming terrain profile. The upcoming terrain profile information may include road grade, traffic velocity in the overtake lane 4, road construction information, weather conditions, speed limit ahead on the route, etc. In such embodiments, the available engine peak power may also be determined based on the upcoming terrain profile. For example, a downward incline, fast moving traffic and dry weather conditions may yield a higher available engine peak power. In contrast, an upward incline, traffic congestion and/or wet or snowy weather conditions may result in a lower available engine peak power as the engine 101 and/or the EM 106 will have to provide more power to overcome the incline.

Figure 3:
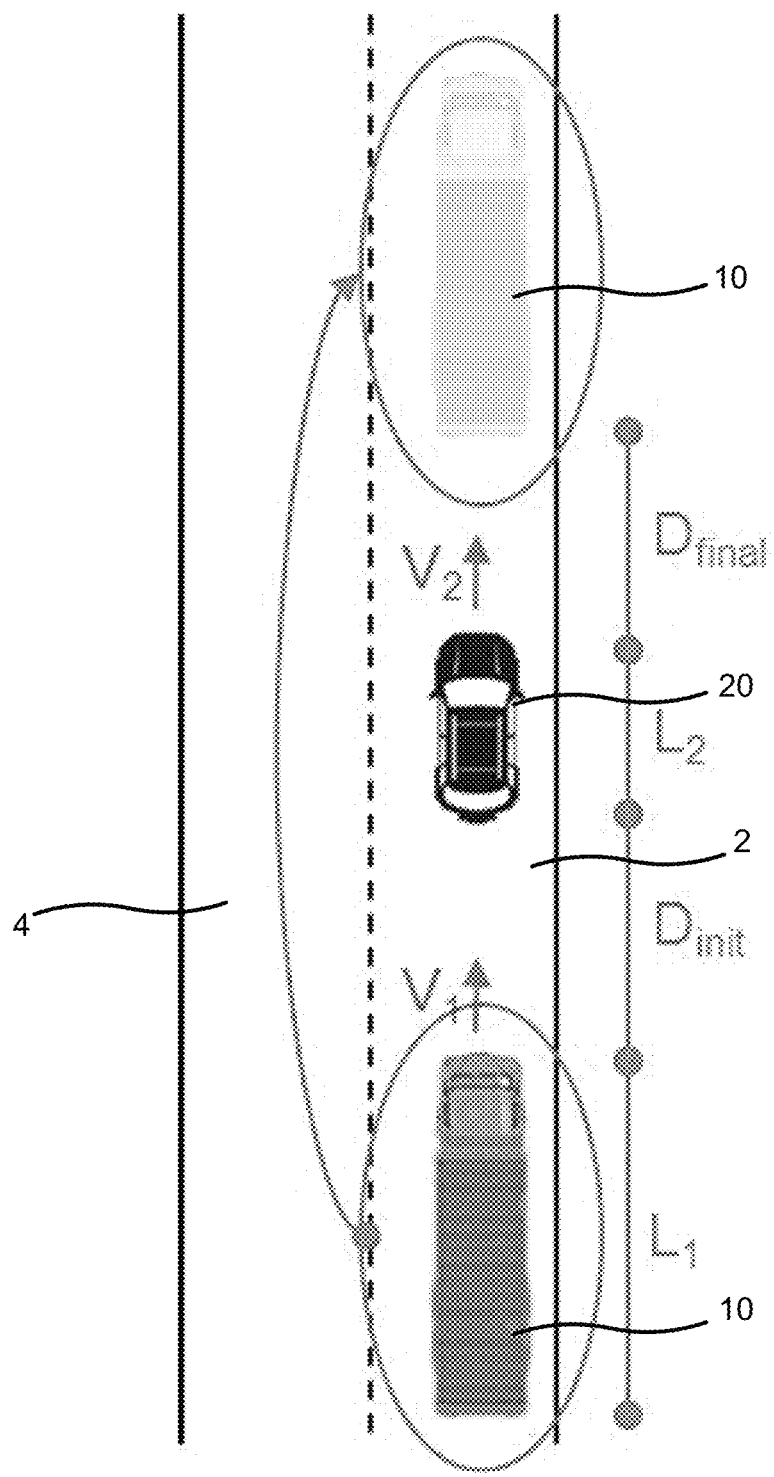
FIG. 3 is a schematic illustration of a control vehicle traveling in a vehicle lane and preparing to overtake a front vehicle traveling in the vehicle lane ahead of the control vehicle by moving in an overtake lane adjacent to the vehicle lane.

FIG. 3 is schematic illustration showing the control vehicle 10 traveling in a vehicle lane 2, and a front vehicle 20 is traveling in the vehicle lane 2 ahead of the control vehicle 10. The overtake lane 4 is adjacent to the vehicle lane 2. In some embodiments, the controller 170 is structured to determine an overtake parameter for overtaking the front vehicle 20. The overtake parameter may include a control vehicle length $L_1$ of the control vehicle 10 (e.g., a predetermined length), a front vehicle length $L_2$ of the front vehicle 20 (e.g., determined using an onboard sensor such as a radar, or via vehicle to vehicle communication), an initial distance $D_{init}$ between the control vehicle 10 and the front vehicle 20 before overtaking (e.g., determined using an onboard sensor such as a radar or via vehicle to vehicle communication based on data received from the front vehicle 20), a final distance $D_{final}$ between the control vehicle 10 and front vehicle 20 after overtaking (e.g., a pre-calibrated distance based on speed to ensure a minimum separation distance when the overtake maneuver is completed such as based on the two second rule determined via real time measurement of the front velocity $V_2$ of the front vehicle 20), an initial velocity $V_1$ of the control vehicle 10 before overtaking, and/or the front vehicle velocity $V_2$ (e.g., determined via an onboard sensor such as a radar or vehicle to vehicle communication).

The controller 170 may be structured to determine the overtake velocity based on the overtake parameter. For example, the overtake velocity may include a sum of the front vehicle velocity $V_2$ of the front vehicle and a target velocity difference between the front vehicle velocity $V_2$ and the velocity of the control vehicle 10. The target velocity difference may be a predefined parameter which may be determined through heuristic data or simulations which allows the overtake time to be less than a threshold overtake time. The controller 170 is structured to determine the overtake time for the control vehicle 10 to overtake the front vehicle 20 based on the overtake velocity of the control vehicle 10.

Figure 6:
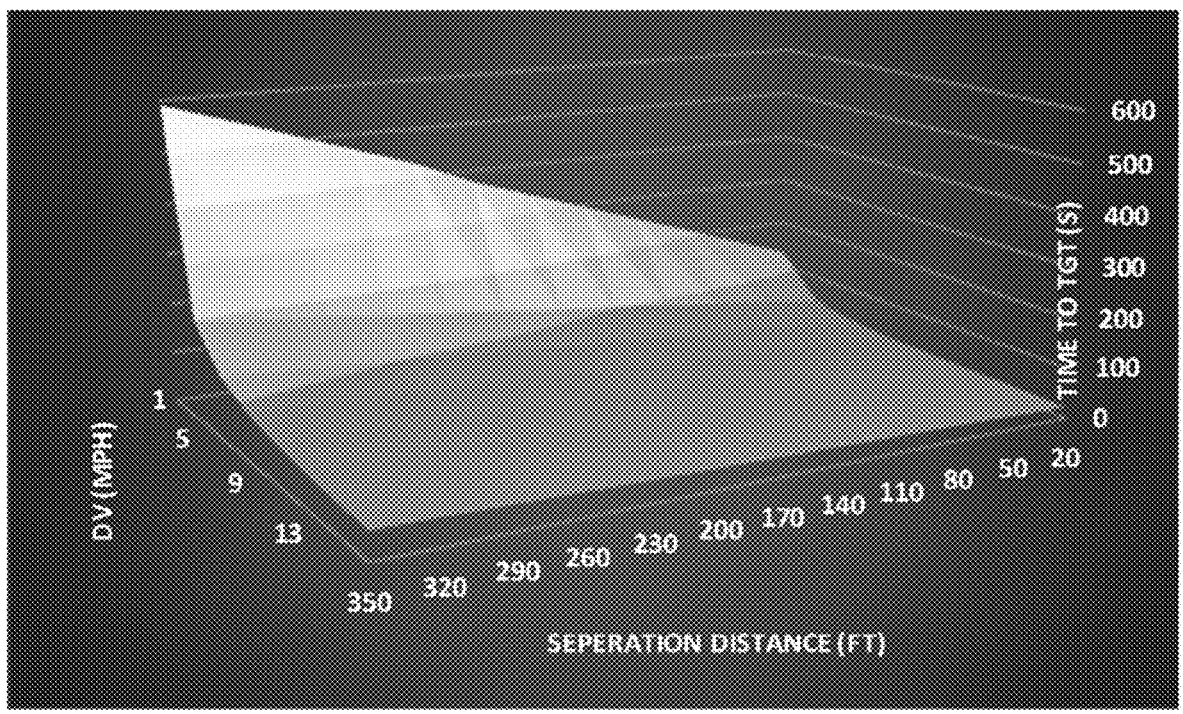
FIGS. 6 and 7 show plots of separation distance between the control vehicle and a front vehicle that the control vehicle is overtaking based on various target velocity differences (dV) between the control vehicle and the front vehicle, and overtake time and overtake distance traversed by the control vehicle to overtake the front vehicle as calculated by the controller of FIG. 2.
Figure 7:
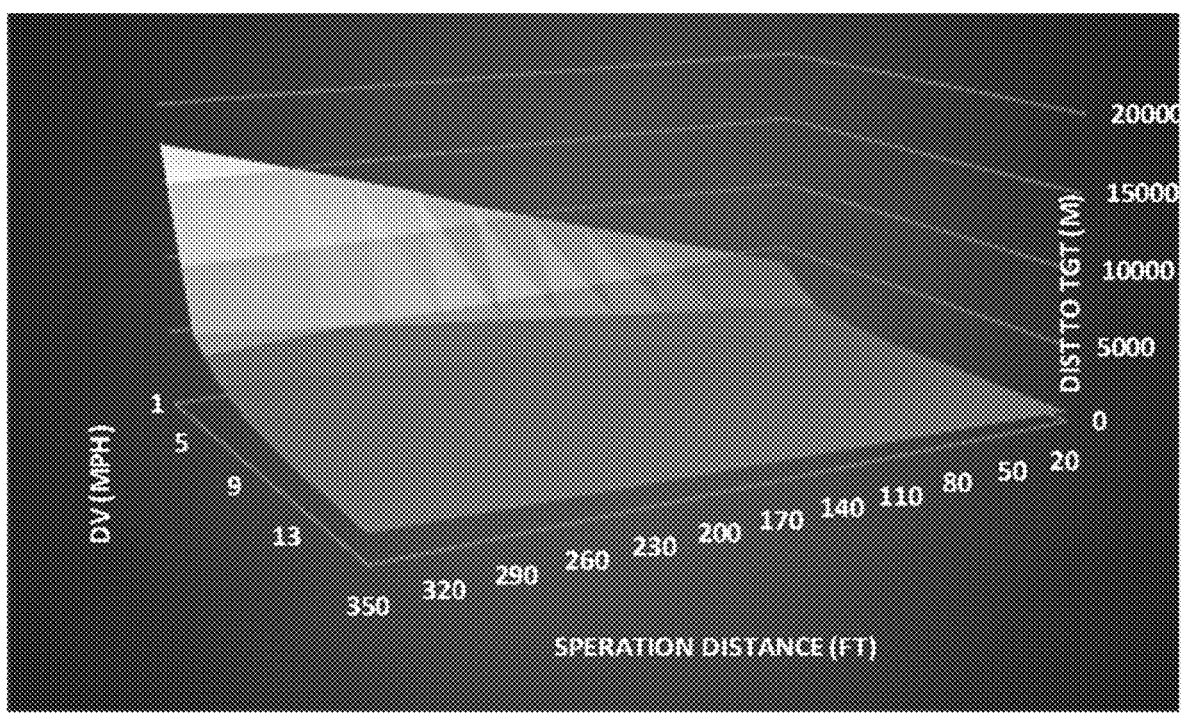

FIGS. 6 and 7 show 3D plots of separation distance between the control vehicle 10 and the front vehicle 20 for various velocity differences (dV) between the control vehicle velocity $V_1$ and the front vehicle velocity $V_2$, and corresponding overtake time (Time to TGT—FIG. 6) and overtake distance (Dist. to TGT—FIG. 7). The overtake time and overtake distance may be dynamically determined based on the front vehicle velocity $V_2$ which may be continuously changing.

As described previously, the controller 170 may also be structured to determine if the determined overtake velocity desired to achieve the overtake maneuver in the determined overtake time is achievable based on the control vehicle parameter, or the available peak engine power based on the control vehicle parameter. In other words, the controller 170 is structured to determine if the engine 101 has sufficient power available to attain the overtake velocity. If the overtake velocity is not achievable, the controller 170 may abort the overtake maneuver.

The controller 170 is structured to determine a direction of traffic in the overtake lane 4 that is adjacent to the vehicle lane 2 (e.g., in response to the overtake velocity being achievable). In response to a direction of traffic in the overtake lane 4 being the same as a direction of traffic in the vehicle lane, the controller 170 is structured to determine if the overtake velocity is less than or equal to an allowed velocity, e.g., a specified speed limit on the vehicle route. In response to the overtake velocity being less than the allowed velocity, i.e., the control vehicle 10 can execute the overtake maneuver while being within the speed limit, the controller 170 is structured to execute the overtake maneuver. In some embodiments, the controller 170 may execute the overtake maneuver by adjusting a parameter of at least one of the engine 101 (e.g., increase engine rpm) or the transmission 102 (e.g., downshift the transmission) of the control vehicle 10 so as to cause the control vehicle 10 to overtake the front vehicle 20 within the overtake time. In other embodiments, the controller 170 may provide a command to an operator the control vehicle 10 to execute the overtake maneuver.

Figure 9:
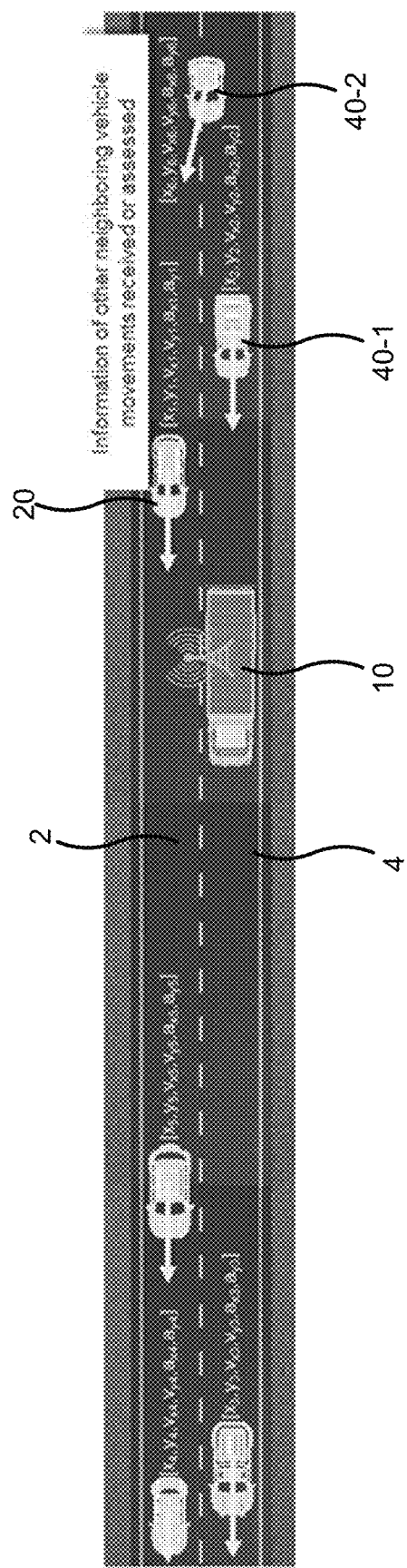
FIG. 9 is a schematic illustration of a control vehicle traveling in an overtake lane with a plurality of rear vehicles present in the overtake lane.

An overtake maneuver may also result in backing up of traffic traveling in the overtake lane 4 behind the control vehicle 10. For example, FIG. 9 is a schematic illustration of a scenario in which a plurality of rear vehicles 40-1, 40-2 are following the control vehicle 10 in the vehicle lane 2 and the overtake lane 4. The control vehicle 10 is in the process of performing an overtake maneuver and traveling in the overtake lane 4 to overtake the front vehicle 20. While a particular scenario is shown, there can be any number of rear vehicles traveling in the overtake lane 4 behind the control vehicle 10.

In some embodiments, the controller 170 may be structured to determine a number of rear vehicles traveling in the overtake lane 4 behind the control vehicle 10 within a rear distance horizon. The rear distance horizon may be a predetermined distance (e.g., based on a sensor range of an onboard sensor or a heuristically determined distance). The controller 170 is structured to execute the overtake maneuver in response to the number of rear vehicles being less than a predefined threshold number (e.g., predefined number such as 1, 2 or 3 rear vehicles being present in the rear distance horizon behind the control vehicle 10). For example, if the number of rear vehicles is less than the predefined threshold number, this may correspond to a low probability of traffic backup occurring when the control vehicle 10 is performing the overtake maneuver.

If the number of rear vehicles is greater than the predefined threshold number, the controller 170 is structured to determine operating parameters associated with each of the rear vehicles. For example, as shown in FIG. 9, the operating parameters of the rear vehicles 40-1 and 40-2 may include rear vehicle 40-1, 40-2 location (e.g., coordinates $x_2$, $y_2$, $x_6$, $y_6$), rear vehicle velocities in the x and y directions ($v_{x2}$, $v_{y2}$, $v_{x6}$, $v_{y6}$) and rear vehicle acceleration in the x and y directions ($a_{x2}$, $a_{y2}$, $a_{x6}$, $a_{y6}$). The operating parameters of each of the rear vehicles may be determined via an onboard sensor of the control vehicle 10 (e.g., a radar) or via vehicle to vehicle communication. The controller 170 is structured to determine expected separation distance between the control vehicle 10 and a closest of the rear vehicles (e.g., rear vehicle 40-1), and between each of the rear vehicles (e.g., between rear vehicles 40-1 and 40-2) based on expected deceleration of each of the rear vehicles upon execution of the overtake maneuver. The expected separation distance and expected deceleration of each of the rear vehicles may be determined based on the overtake velocity of the control vehicle 10 and the operating parameters of the rear vehicles.

If the expected separation distance between the control vehicle 10 and at least the closest of the rear vehicles is less than a separation distance threshold, the control vehicle 10 may abort the overtake maneuver. For example, as the control vehicle 10 moves into the overtake lane 4, the rear vehicles will have to decelerate to maintain a desired distance (i.e., the expected separation distance) from the control vehicle 10. The separation distance threshold may correspond to a separation distance below which the closest rear vehicle (e.g., rear vehicle 40-1) gets dangerously close to the control vehicle 10, for example, based on the 2 second rule. Such a separation distance may be considered undesirable, prompting the controller 170 to abort the overtake maneuver.

If the expected separation distance is greater than the separation distance threshold, the controller 170 is structured to determine an expected rear vehicle count of the rear vehicles expected to accumulate in the overtake lane 4 upon execution of the overtake maneuver. For example, as the control vehicle 10 moves into the overtake lane 4 to perform the overtake maneuver, this may cause the rear vehicles to decelerate which can lead to traffic backup happening in the overtake lane 4. If the expected rear vehicle count of the rear vehicles accumulating in the overtake lane 4 is greater than a threshold count, the controller 170 may abort the overtake maneuver. For example, the threshold count may correspond to traffic backup occurring in the overtake lane 4 as the control vehicle 10 is performing the overtake maneuver beyond the rear distance horizon, and/or traffic in the overtake lane 4 slowing below a predefined low speed threshold or a variable low speed threshold based on a speed limit at the location of the route where the overtake maneuver is being performed. In some embodiments, the threshold count may be a predefined number. In other embodiments, the threshold count may be a variable based on a time of day, weather conditions, average traffic velocity in the overtake lane 4, and/or traffic information.

The controller 170 is structured to execute the overtake maneuver in response to the expected rear vehicle count being less than a threshold count. In this manner, traffic backup is prevented or reduced, which reduces impact on traffic flow efficiency due to the control vehicle 10 performing the overtake maneuver, reduces impact on fuel efficiency, and increases safety.

Figure 8:
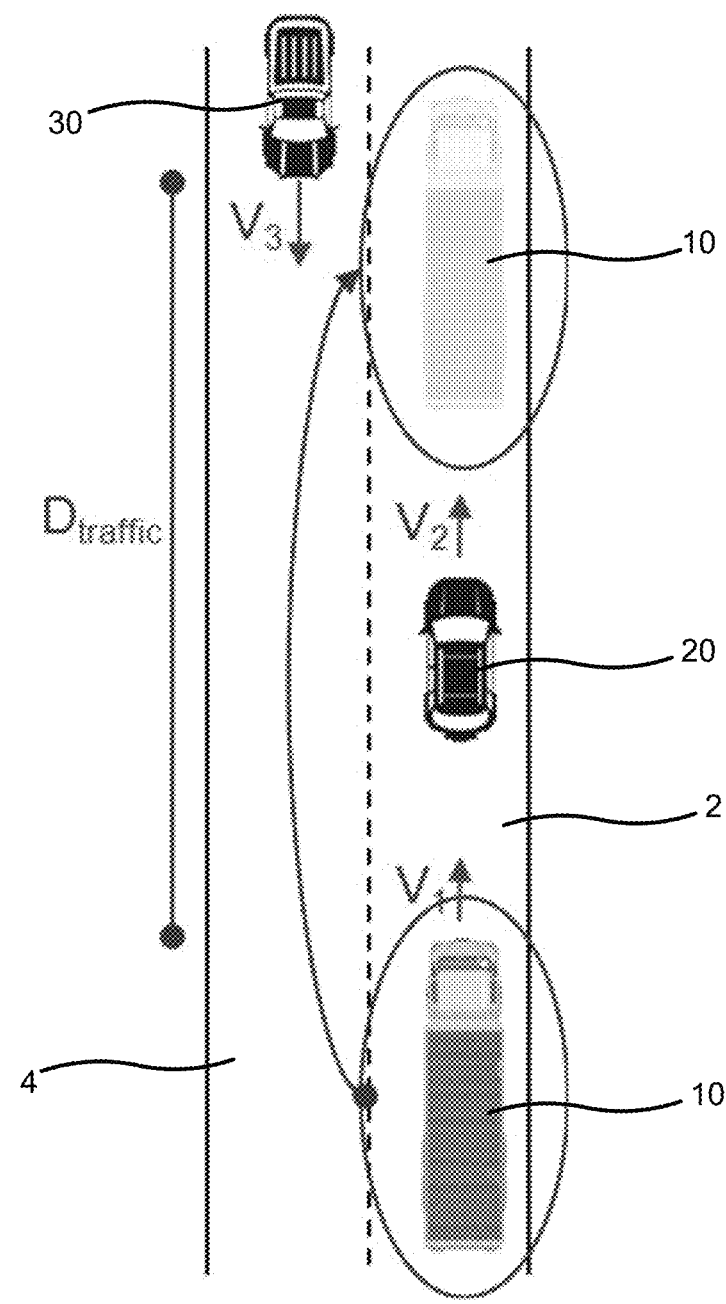
FIG. 8 is a schematic illustration of a control vehicle traveling in a vehicle lane preparing to overtake a front vehicle when traffic in an overtake lane is traveling in an opposite direction as the vehicle lane, and an oncoming vehicle is present in the overtake lane.

While, the above mentioned situations describe scenarios in which the direction of traffic in the overtake lane 4 is in the same direction as the direction of traffic in the vehicle lane 2, in some embodiments, a direction of traffic in the overtake lane 4 may be in an opposite direction to a direction of traffic in the vehicle lane 2. For example, FIG. 8 is a schematic illustration of a scenario in which the control vehicle 10 is traveling in the vehicle lane 2 with the front vehicle 20 traveling in the vehicle lane 2 ahead of the control vehicle 10. A direction of traffic in the overtake lane 4 is in a direction opposite to the vehicle lane 2. An oncoming vehicle 30 is present in the overtake lane 4 and is approaching the control vehicle 10.

The controller 170 is structured to determine if a sum of the encounter time and a safety factor is greater than or equal to the overtake time. The safety factor may include a predefined time or a multiple of the encounter time (e.g., 1×, 2×, 3×, or any other suitable multiple) which allows sufficient time for control vehicle 10 to return from the overtake lane 4 into the vehicle lane 2 without encountering the oncoming vehicle 30. If the sum is less than the overtake time, the controller 170 may abort the overtake maneuver. If the sum is greater than or equal to the overtake time, the controller 170 executes the overtake maneuver. Thus, systems and methods described herein allow the control vehicle 10 to overtake a front vehicle 20 when a direction of traffic in the overtake lane 4 is in an opposite direction to the direction of traffic in the vehicle lane 2.

Figure 2:
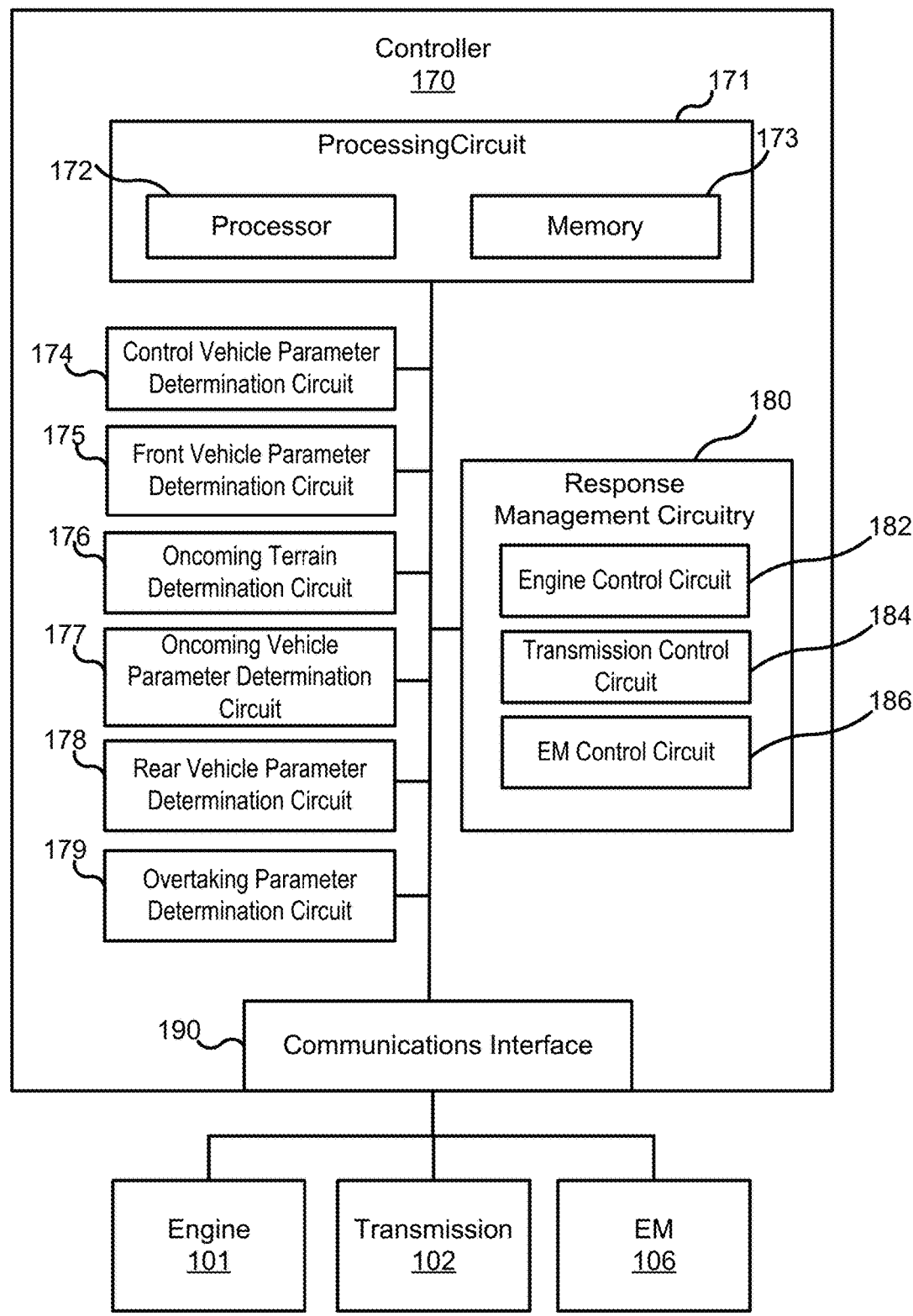
FIG. 2 is a schematic block diagram of the controller of the control vehicle of FIG. 1, according to an embodiment.

In various embodiments, the controller 170 may comprise an electronic control unit structured to receive various signals including internal, external static or external dynamic inputs as described herein for controlling the engine 101, the transmission 102, and/or the EM device 106 so as to perform the overtake maneuver. As shown in FIG. 2, the controller 170 includes a processing circuit 171 having a processor 172 and a memory 173, a control vehicle parameter determination circuit 174, a front vehicle parameter determination circuit 175, an upcoming terrain determination circuit 176, an oncoming vehicle parameter determination circuit 177, a rear vehicle parameter determination circuit 178, and an overtake parameter determination circuit 179. The controller 170 may also include a response management circuitry 180 including an engine control circuit 182, a transmission control circuit 184, and an EM control circuit 186.

The processor 172 may comprise a microprocessor, programmable logic controller (PLC) chip, an ASIC chip, or any other suitable processor. The processor 172 is in communication with the memory 173 and structured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is structured to store look up tables, algorithms, or instructions.

In one configuration, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 are embodied as hardware units, such as electronic control units. As such, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may be embodied as one or more circuitry components including, but not limited to, processing circuitry, network interfaces, peripheral devices, input devices, output devices, sensors, etc. In some embodiments, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may also include programmable hardware devices such as field programmable gate arrays, programmable array logic, programmable logic devices or the like. In this regard, the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may include one or more memory devices for storing instructions that are executable by the processor(s) of the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect to the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180. Thus, the depicted configuration represents the aforementioned arrangement where the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 are embodied as machine or computer-readable media. However, as mentioned above, this illustration is not meant to be limiting as the present disclosure contemplates other embodiments such as the aforementioned embodiment where the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 are structured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the control vehicle parameter determination circuit 174, the front vehicle parameter determination circuit 175, the upcoming terrain determination circuit 176, the oncoming vehicle parameter determination circuit 177, the rear vehicle parameter determination circuit 178, the overtake parameter determination circuit 179, and the response management circuitry 180 may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 190 may include wireless interfaces (e.g., jacks, antennas, transmitters, receivers, transceivers, wire terminals, etc.) for conducting data communications with various systems, devices, or networks. For example, the communications interface 190 may include an Ethernet card and port for sending and receiving data via an Ethernet-based communications network and/or a Wi-Fi transceiver for communicating with other vehicles (e.g., for vehicle-to-vehicle communication), a server (e.g., for vehicle-to-server communication), an infrastructure (e.g., for vehicle-to-infrastructure), the internet, news sources or any other sources of external static or dynamic inputs, and the controller 170 via, for example, a communication network (e.g., the cloud). The communications interface 190 may be structured to communicate via local area networks or wide area networks (e.g., the Internet, etc.) and may use a variety of communications protocols (e.g., IP, LON, Bluetooth, ZigBee, radio, cellular, near field communication, etc.).

The control vehicle parameter determination circuit 174 is structured to determine the control vehicle parameter (e.g., control vehicle weight, the control vehicle aerodynamic resistance, the control vehicle rolling resistance and/or the control vehicle transmission loss) of the control vehicle 10. The control vehicle parameter may include a predetermined parameter, for example, the control vehicle weight may be predetermined at a weigh station, or variable parameter determined using the operating parameter of the control vehicle 10. For example, the control vehicle aerodynamic resistance may be determined using the control vehicle velocity and wind speed, the control vehicle rolling resistance may be determined based on the control vehicle velocity, height and weight, and the control vehicle transmission loss may be determined based on the control vehicle velocity and transmission gear ratio of the control vehicle 10. The control vehicle parameter determination circuit 174 may use one or more of the determined control vehicle parameters to determine the available peak engine power, as previously described herein.

The front vehicle parameter determination circuit 175 is structured to determine the front vehicle parameter, for example, the front vehicle length $L_2$ and the front vehicle velocity $V_2$. The front vehicle parameter may be determined using an onboard sensor (e.g., a radar) and/or vehicle to vehicle communication.

The upcoming terrain determination circuit 176 is structured to determine upcoming terrain parameter to be encountered by the control vehicle ahead of a current location of the control vehicle 10 in the overtake lane 4 and/or the vehicle lane 2 on the route that the control vehicle 10 is traveling on. The upcoming terrain parameter may include road grade (e.g., incline or slope), traffic flow information (e.g., speed of vehicles ahead of the control vehicle 10), weather conditions, road construction, speed limit information, etc. The upcoming terrain parameter may be determined via onboard sensors (e.g., onboard GPS sensor), vehicle to vehicle communication, vehicle to server communication or any other suitable means. In some embodiments, the determined upcoming terrain parameter may also be used by the control vehicle parameter determination circuit 174 to determine the available peak engine power.

The oncoming vehicle parameter determination circuit 177 is structured to determined oncoming vehicle parameter of the oncoming vehicle 30 approaching the control vehicle 10 in the overtake lane 4. The oncoming vehicle parameter may include the oncoming vehicle velocity $V_3$ and a distance $D_{traffic}$ between the control vehicle 10 and the oncoming vehicle 30, and may be determined using an onboard sensor or via vehicle to vehicle communication.

The rear vehicle parameter determination circuit 178 is structured to determine rear vehicle parameter of one or more rear vehicles (e.g., the rear vehicles 40-1, 40-2) following the control vehicle 10 in the overtake lane 4. The rear vehicle parameter may include distance, velocity and/or acceleration of the one or more rear vehicles, as previously described herein and may be determined using an onboard sensor or via vehicle to vehicle communication.

The overtake parameter determination circuit 179 is structured to determine at least some of the overtake parameter, use the overtake parameter to determine the overtake time and velocity, and determine whether the overtake maneuver can be executed or should be aborted. The overtake parameter may include the control vehicle length (e.g., a predefined length), the front vehicle length (e.g., received from the front vehicle parameter determination circuit 175), an initial distance between the control vehicle 10 and the front vehicle 20 before overtaking (e.g., determined using an onboard sensor or via vehicle to vehicle communication), the final distance $D_{final}$ between the control vehicle 10 and front vehicle 20 after overtaking (e.g., a predefined distance or determined based on the front vehicle velocity $V_2$), an initial velocity of the control vehicle 10 before overtaking, and the front vehicle velocity $V_2$ (e.g., received from the front vehicle parameter determination circuit 175). The overtake parameter determination circuit 179 may use one or more of these parameters to determine the overtake velocity for performing the overtake maneuver, the overtake time based on the overtake velocity and the overtake distance for the control vehicle 10 to overtake the front vehicle 20. The overtake parameter determination circuit 179 may instruct the response management circuitry 180 to execute the overtake maneuver, or determine that the overtake maneuver should be aborted.

In some embodiments in which one or more rear vehicles are present in the overtake lane 4 behind the control vehicle 10, the overtake parameter may also include a number of rear vehicles present in the overtake lane 4 within the rear distance horizon and operating parameter of the rear vehicles (e.g., location, velocity and acceleration thereof, as previously described herein). In such embodiments, the overtake parameter determination circuit 179 is also structured to determine expected separation distance between the control vehicle 10 and the rear vehicles, as previously described herein, based on expected deceleration of each of the rear vehicles, if the number of rear vehicles exceeds a predetermined threshold number. If the expected separation distance is greater than a separation distance threshold, the overtake parameter determination circuit 179 is also structured to determine an expected rear vehicle count of the rear vehicles expected to accumulate in the overtake lane 4 upon execution of the overtake maneuver, and instruct the response management circuitry 180 to execute the overtake maneuver if the expected rear vehicle count is less than the threshold count. The threshold count may be a predetermined number or a variable determined by the rear vehicle parameter determination circuit 178 based on the time of day, weather conditions, average traffic velocity in the overtake lane 4, and traffic information.

In some embodiments, a direction of traffic in the overtake lane 4 may be in an opposite direction to a direction of traffic in the vehicle lane 2. In such embodiments, the overtake parameter determination circuit 179 may also be structured to use information regarding the oncoming vehicle velocity $V_3$ and the distance $D_{traffic}$ between the control vehicle 10 and the oncoming vehicle 30 to determine an encounter time to encounter the oncoming vehicle at the overtake velocity. In such embodiments, the overtake parameter determination circuit 179 is also structured to determine if a sum of the encounter time and a safety factor is greater than or equal to the overtake time, as previously described herein, and instruct the response management circuitry 180 to execute the overtake maneuver in response to the sum being greater than or equal to the overtake time.

The response management circuitry 180 includes the engine control circuit 182, the transmission control circuit 184, and the EM control circuit 186. The engine control circuit 182 may be structured to adjust a parameter of the engine 101 (e.g., increase engine rpm), and the transmission control circuit 184 may be structured to adjust a parameter of the transmission 102 (e.g., downshift the transmission 102) based on instructions from the overtake parameter determination circuit 179 to cause the control vehicle 10 to overtake the front vehicle 20. For example, the engine control circuit 182 may be structured to increase engine speed and the transmission control circuit 184 may downshift the transmission 102 to increase torque and provide acceleration to allow the control vehicle 10 to attain the overtake velocity.

The EM control circuit 186 is structured to work cooperatively with the engine control circuit 182 to distribute a power split between the engine 101 and the EM device 106 such that the overtake maneuver may be performed while having minimal impact on emissions and fuel economy.

Figure 11A:
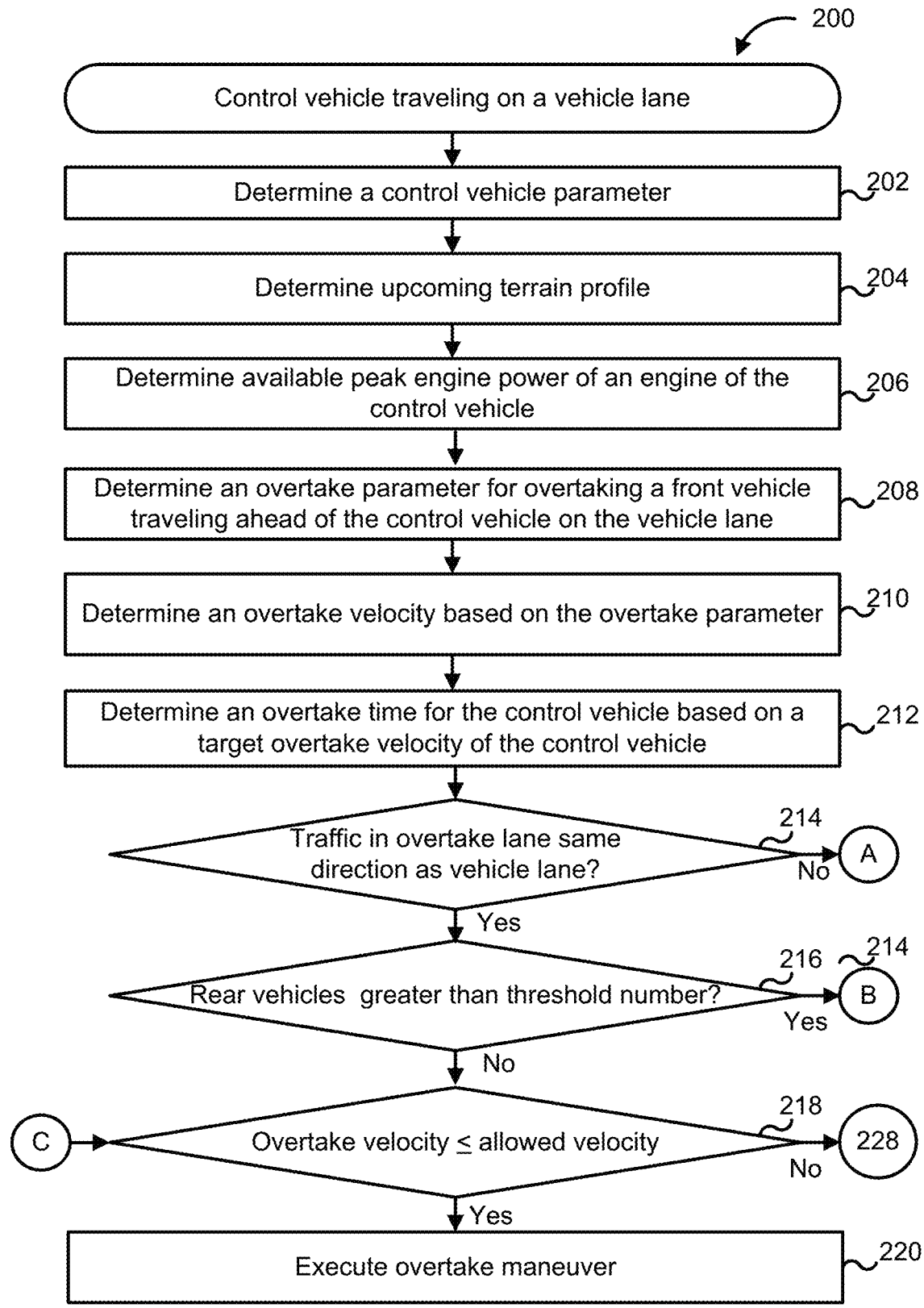
FIGS. 11A, 11B, and 11C are schematic flow diagrams of a method for controlling an overtake maneuver of a control vehicle, according to various embodiment.
Figure 11B:
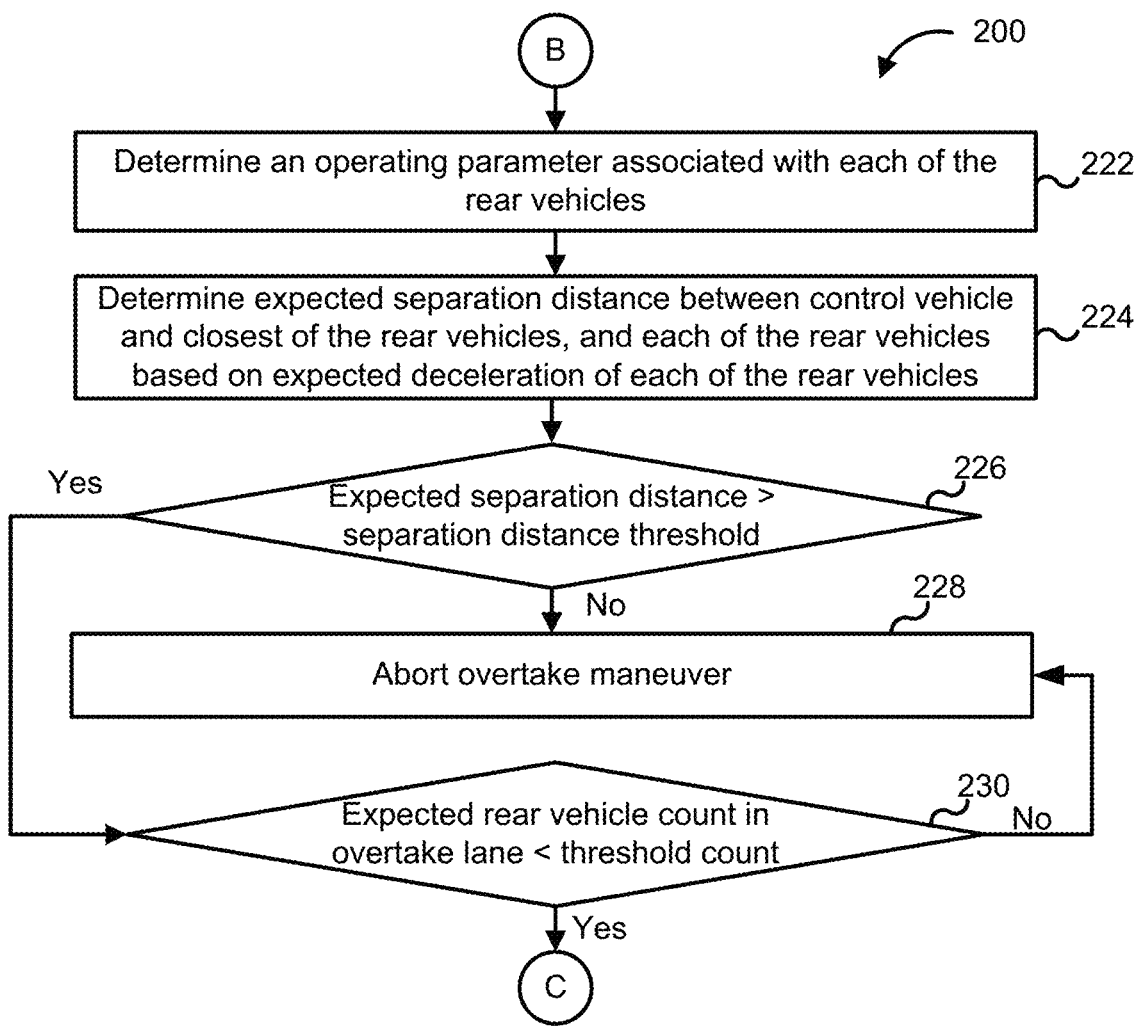
Figure 11C:
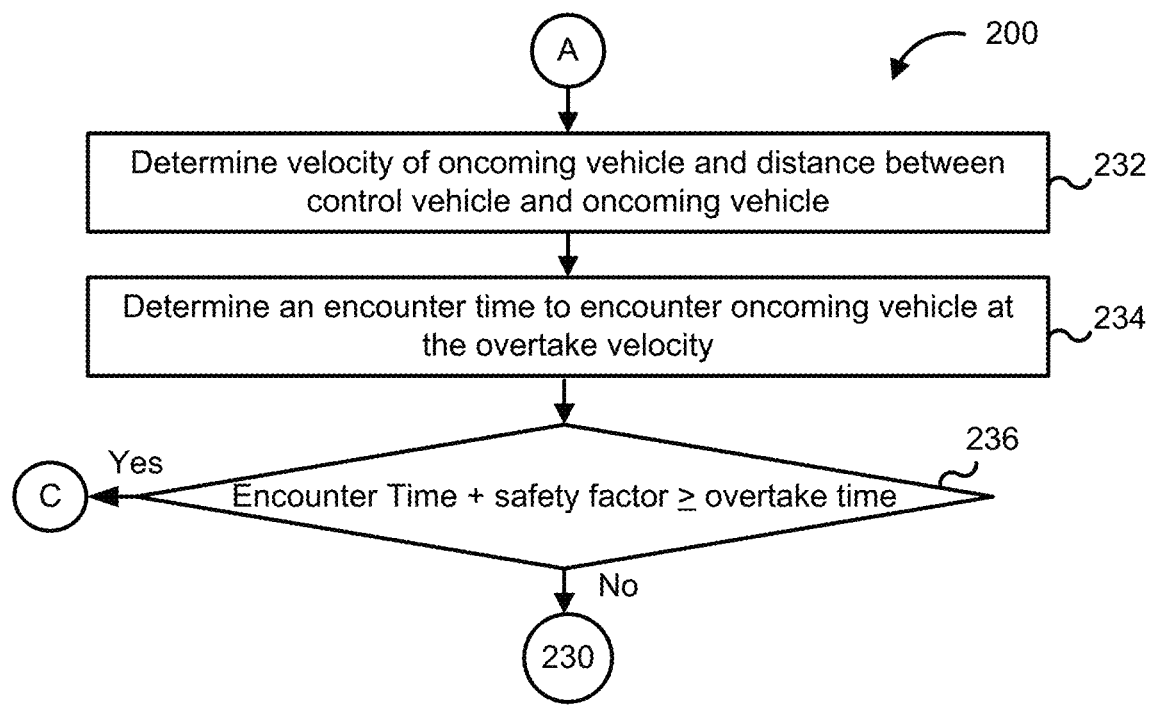

FIGS. 11A, 11B and 11C are schematic flow diagrams of an example method 200 for controlling an overtake maneuver of the control vehicle 10 or any other control vehicle, according to an embodiment. It should be appreciated that while the method 200 is described with respect to the controller 170 included in the control vehicle 10, the operations of the method 200 may be performed by any controller included in any control vehicle, or a plurality of vehicles included in a vehicle platoon.

The method 200 includes determining control vehicle parameter of the control vehicle 10 traveling on the vehicle lane 2 by the controller 170, at 202. The control vehicle parameter includes the control vehicle weight, the control vehicle aerodynamic resistance, the control vehicle rolling resistance and/or the control vehicle transmission loss, as previously described herein. In some embodiments, the controller 170 determines an upcoming terrain profile to be encountered by the control vehicle 10 during the overtaking maneuver, at 206. For example, the controller 170 may receive information from a GPS sensor, a news server, a weather service, etc. to determine the upcoming terrain profile. At 206, the controller 170 determines an available peak engine power of the engine 101 of control vehicle 10 based on the control vehicle parameters and, in some implementations, also based on the upcoming terrain profile of the control vehicle 10 before overtaking, as previously described herein.

At 208, the controller 170 determines an overtake parameter for overtaking the front vehicle 20 traveling ahead of the control vehicle 10 on the vehicle lane 2. The overtake parameter include the control vehicle length $L_1$, the front vehicle length $L_2$, the initial distance $D_{init}$ between the control vehicle 10 and the front vehicle 20 before overtaking, the final distance $D_{final}$ between the control vehicle 10 and front vehicle 20 after overtaking, an initial velocity $V_1$ of the control vehicle 10 before overtaking, and the front vehicle velocity $V_2$, which may be determined using onboard sensors or vehicle to vehicle communication, as previously described herein.

At 210, the controller 170 determines an overtake velocity based on the overtake parameter. For example, the overtake velocity may include a sum of the front vehicle velocity $V_2$ and a target velocity difference between the front vehicle velocity $V_2$ and the control vehicle velocity $V_1$. At 212, the controller 170 determines an overtake time for the control vehicle 10 to overtake the front vehicle 20 based on an overtake velocity of the control vehicle 10. In some embodiments, the controller 170 also determines an overtake distance traveled by the control vehicle 10 during the overtake maneuver.

At 214, the controller 170 determines, if a direction of traffic in the overtake lane 4 is in a same direction as a direction of traffic in the vehicle lane 2. If a direction of traffic in the overtake lane 4 is the same as the direction of traffic in the vehicle lane 2 (214: YES), the controller 170 may determine whether a number of rear vehicles following the control vehicle 10 is greater than a threshold number, at 216. If the number of rear vehicles is less than the threshold number (216: NO), the controller 170 determines if the overtake velocity is less than or equal to an allowed velocity (e.g., a specified speed limit), at 218. If the overtake velocity is less than or equal to the allowed velocity (218: YES), the controller 170 executes the overtake maneuver, at 220. However, if the overtake velocity is greater than the allowed velocity (218: NO), the method 200 moves to operation 228, and the controller aborts the overtake maneuver.

If at operation 216, the controller 170 determines that the number of rear vehicles behind the control vehicle 10 is greater than the threshold number (216: YES), the controller 170 determines an operating parameter associated with each of the rear vehicles (e.g., location, velocity and acceleration), at 222. At 224, the controller 170 determines expected separation distance between the control vehicle 10 and closest of the rear vehicles (e.g., the rear vehicle 40-1), and between each of the rear vehicles (e.g., between rear vehicle 40-1 and 40-2) based on expected deceleration of each of the rear vehicles upon execution of the overtake maneuver. At 226, the controller 170 determines if the expected separation distance is greater than a separation distance threshold. If the expected separation distance is less than the separation distance threshold (226: NO), the method 200 moves to operation 228, and the overtake maneuver is aborted.

In response to the expected separation distance being greater than a separation distance threshold (226: YES), the controller 170 determines if an expected rear vehicle count of the rear vehicles expected to accumulate in the overtake lane 4 upon execution of the overtake maneuver is greater a threshold count, at 230. If the expected rear vehicle count is greater than the threshold count, (230: NO), the method 200 moves to operation 228, and the overtake maneuver is aborted. In response to the expected rear vehicle count being less than the threshold count, the method 200 moves to operation 218, as previously described herein.

If at operation 214, the controller 170 determines that a direction of traffic in the overtake lane 4 is opposite to the direction of traffic lane in the vehicle lane 2 (214: NO), the method 200 moves to operation 232, and the controller 170 determines a velocity of the oncoming vehicle 30, and distance between the control vehicle 10 and the oncoming vehicle 30. At 234, the controller 170 determines an encounter time to encounter the oncoming vehicle 30 at the overtake velocity. At 236, the controller 170 determines if a sum of the encounter time and a safety factor is greater than or equal to the overtake time, as previously described herein. If the sum is less than the overtake time (236: YES), the method 200 moves to operation 228, and the overtake maneuver is aborted. In response to the sum being greater than or equal to the overtake time, the method 200 moves to operation 218, as previously described herein.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:
1. A system comprising:
a controller structured to:
receive at least one overtake parameter associated with a control vehicle for overtaking a front vehicle in a vehicle lane, the at least one overtake parameter comprising a number of rear vehicles traveling in an overtake lane behind the control vehicle within a rear distance horizon;

receive an indication of a direction of traffic in the overtake lane that is adjacent to the vehicle lane;

receive an indication that the at least one overtake parameter satisfies at least one condition according to the direction of the traffic in the overtake lane, the at least one overtake parameter comprising the number of rear vehicles traveling in the overtake lane behind the control vehicle within the rear distance horizon, and the at least one condition comprising a predefined threshold number of rear vehicles; and in response to the number of rear vehicles being less than the predefined threshold number of rear vehicles, execute an overtake maneuver by adjusting at least one parameter of the control vehicle or providing a command to an operator of the control vehicle to execute the overtake maneuver.

2. The system of claim 1, wherein the at least one overtake parameter further comprises an overtake velocity for the control vehicle to overtake the front vehicle traveling ahead of the control vehicle in the vehicle lane and the at least one condition further comprises a predefined allowed velocity, and wherein the controller is further structured to execute the overtake maneuver in response to the overtake velocity being less than the predefined allowed velocity.

3. The system of claim 1, wherein the direction of traffic in the overtake lane is the same as in the vehicle lane.

4. The system of claim 1, wherein the at least one condition further comprises a predefined allowed velocity, and wherein the controller is further structured to:

in response to the direction of traffic in the overtake lane being the same as the direction of traffic in the vehicle lane, receive an indication that an overtake velocity for the control vehicle is less than or equal to the predefined allowed velocity and execute the overtake maneuver based on the overtake velocity for the control vehicle being less than or equal to the predefined allowed velocity.

5. The system of claim 4, wherein the predefined allowed velocity corresponds to a speed limit associated with a route of the control vehicle.

6. The system of claim 1, wherein executing the overtake maneuver comprises adjusting at least one vehicle parameter, and wherein the at least one vehicle parameter comprises a parameter of at least one of an engine or a transmission of the control vehicle.

7. The system of claim 1, wherein the controller is further structured to:

receive an available peak engine power of an engine of the control vehicle, and execute the overtake maneuver in response to an overtake velocity being achievable based on the available peak engine power.

8. The system of claim 7, wherein the available peak engine power of the engine is based on a control vehicle parameter of the control vehicle, and wherein the control vehicle parameter comprises at least one of a control vehicle weight, a control vehicle aerodynamic resistance, a control vehicle rolling resistance, or a control vehicle transmission loss.

9. The system of claim 8, wherein the controller is structured to:

receive an upcoming terrain profile to be encountered by the control vehicle during the overtake maneuver, and wherein the available peak engine power is also based on the upcoming terrain profile.

10. The system of claim 1, wherein the direction of traffic in the overtake lane is opposite to a direction of traffic in the vehicle lane;

wherein the at least one overtake parameter comprises at least one of: a velocity of at least one oncoming vehicle approaching the control vehicle in the overtake lane, a distance between the control vehicle and the at least one oncoming vehicle, or an encounter time to encounter the at least one oncoming vehicle at an overtake velocity; and wherein the at least one condition comprises a respective threshold corresponding to at least one of the at least one overtake parameter.

11. The system of claim 1, wherein the at least one overtake parameter comprises at least one of: a control vehicle length, a front vehicle length, an initial distance between the control vehicle and the front vehicle before overtaking, a final distance between the control vehicle and the front vehicle after overtaking, an initial velocity of the control vehicle before overtaking, or a front vehicle velocity.

12. A method, comprising:

receiving, by a controller, at least one overtake parameter associated with a control vehicle for overtaking a front vehicle in a vehicle lane, the at least one overtake parameter comprising a number of rear vehicles traveling in an overtake lane behind the control vehicle within a rear distance horizon;

receiving, by the controller, an indication of a direction of traffic in the overtake lane that is adjacent to the vehicle lane;

receiving, by the controller, an indication that the at least one overtake parameter satisfies at least one condition according to the direction of the traffic in the overtake lane, the at least one overtake parameter comprising the number of rear vehicles traveling in the overtake lane behind the control vehicle within the rear distance horizon, and the at least one condition comprising a predefined threshold number of rear vehicles; and in response to the number of rear vehicles being less than the predefined threshold number of rear vehicles, executing, by the controller, an overtake maneuver by adjusting at least one parameter of the control vehicle or providing a command to an operator of the control vehicle to execute the overtake maneuver.

13. The method of claim 12, wherein the at least one overtake parameter further comprises an overtake velocity for the control vehicle to overtake the front vehicle traveling ahead of the control vehicle in the vehicle lane and the at least one condition further comprises a predefined allowed velocity, and wherein the method further comprises:

executing, by the controller, the overtake maneuver in response to the overtake velocity being less than the predefined allowed velocity.

14. The method of claim 12, wherein the direction of traffic in the overtake lane is the same as in the vehicle lane.

15. The method of claim 12, wherein the at least one condition comprises a predefined allowed velocity, and wherein the method further comprises:

in response to the direction of traffic in the overtake lane being the same as the direction of traffic in the vehicle lane, receiving, by the controller, an indication that an overtake velocity for the control vehicle to overtake the front vehicle is less than or equal to the predefined allowed velocity.

16. A non-transitory computer-readable storage medium storing instructions therein that, when executed by one or more processors, cause the one or more processors to perform operations comprising:

receiving at least one overtake parameter associated with a control vehicle for overtaking a front vehicle in a vehicle lane, the at least one overtake parameter comprising a number of rear vehicles traveling in an overtake lane behind the control vehicle within a rear distance horizon;

receiving an indication of a direction of traffic in the overtake lane that is adjacent to the vehicle lane;

receiving an indication that the at least one overtake parameter satisfies at least one condition according to the direction of the traffic in the overtake lane, the at least one overtake parameter comprising the number of rear vehicles traveling in the overtake lane behind the control vehicle within the rear distance horizon, and the at least one condition comprising a predefined threshold number of rear vehicles; and in response to the number of rear vehicles being less than the predefined threshold number of rear vehicles, executing an overtake maneuver by adjusting at least one parameter of the control vehicle or providing a command to an operator of the control vehicle to execute the overtake maneuver.

17. The non-transitory computer-readable storage medium of claim 16, wherein the at least one parameter comprises a parameter of at least one of an engine or a transmission of the control vehicle.

18. The non-transitory computer-readable storage medium of claim 16, wherein the instructions, when executed by the one or more processors, cause the one or more processors to perform further operations comprising:

receiving an available peak engine power of an engine of the control vehicle; and executing the overtake maneuver in response to an overtake velocity being achievable based on the available peak engine power.

19. The non-transitory computer-readable storage medium of claim 18, wherein the available peak engine power of the engine is based on a control vehicle parameter of the control vehicle, and wherein the control vehicle parameter comprises at least one of a control vehicle weight, a control vehicle aerodynamic resistance, a control vehicle rolling resistance, or a control vehicle transmission loss.

20. The method of claim 15, wherein the predefined allowed velocity corresponds to a speed limit associated with a route of the control vehicle.

* * * * *